United States Patent [19]

Cowart et al.

[11] 4,256,012
[45] Mar. 17, 1981

[54] MISSILE LAUNCHER FOR AIRCRAFT

[75] Inventors: William L. Cowart, Chamblee; Cropper W. Holland, Jr.; Don R. Scarbrough, Sr., both of Marietta, all of Ga.

[73] Assignee: Lockheed Corporation, Burbank, Calif.

[21] Appl. No.: 962,560

[22] Filed: Nov. 20, 1978

[51] Int. Cl.³ .............................................. B64D 1/10
[52] U.S. Cl. ................................. 89/1.816; 89/1.5 R; 89/1.5 H; 244/137 R; 244/118.1; 89/1.819
[58] Field of Search ...................... 244/137 R, 118 R; 89/1.5 R, 1.5 H, 1.815, 1.819, 1.8

[56] References Cited

U.S. PATENT DOCUMENTS

| | | | |
|---|---|---|---|
| 2,585,030 | 2/1952 | Nosker | 244/137 R X |
| 3,520,502 | 7/1970 | Smethers | 244/137 R |
| 3,547,000 | 12/1970 | Haberkorn | 89/1.5 R |
| 3,741,504 | 6/1973 | Alberti et al. | 244/137 R |
| 4,161,301 | 7/1979 | Beardsley et al. | 89/1.5 R X |

FOREIGN PATENT DOCUMENTS

| | | | |
|---|---|---|---|
| 1406633 | 10/1968 | Fed. Rep. of Germany | 244/137 R |
| 1074825 | 7/1967 | United Kingdom | 244/137 R |

*Primary Examiner*—David H. Brown
*Attorney, Agent, or Firm*—John J. Sullivan

[57] ABSTRACT

A launching mechanism for missiles from aircraft is defined which eliminates the need for changing the missiles from a transport position to a launch position and which employs the force of gravity as the motive force for launching. Missiles are suspended from carriage assemblies which incorporate an ejector mechanism, power sources, power actuators and trigger/-safety devices. Each carriage/missile unit is installed in a transport module which can be configured to contain an array of missiles. One or more transport modules are installed in the aircraft cargo compartment aligned with each other and an acceleration module, all such modules being secured to the compartment floor and to each other. The acceleration module is the aftmost unit of the launcher system, serving as a transition unit for each missile from the transport modules to the release position and as an acceleration unit for each missile just before it leaves the aircraft.

7 Claims, 9 Drawing Figures

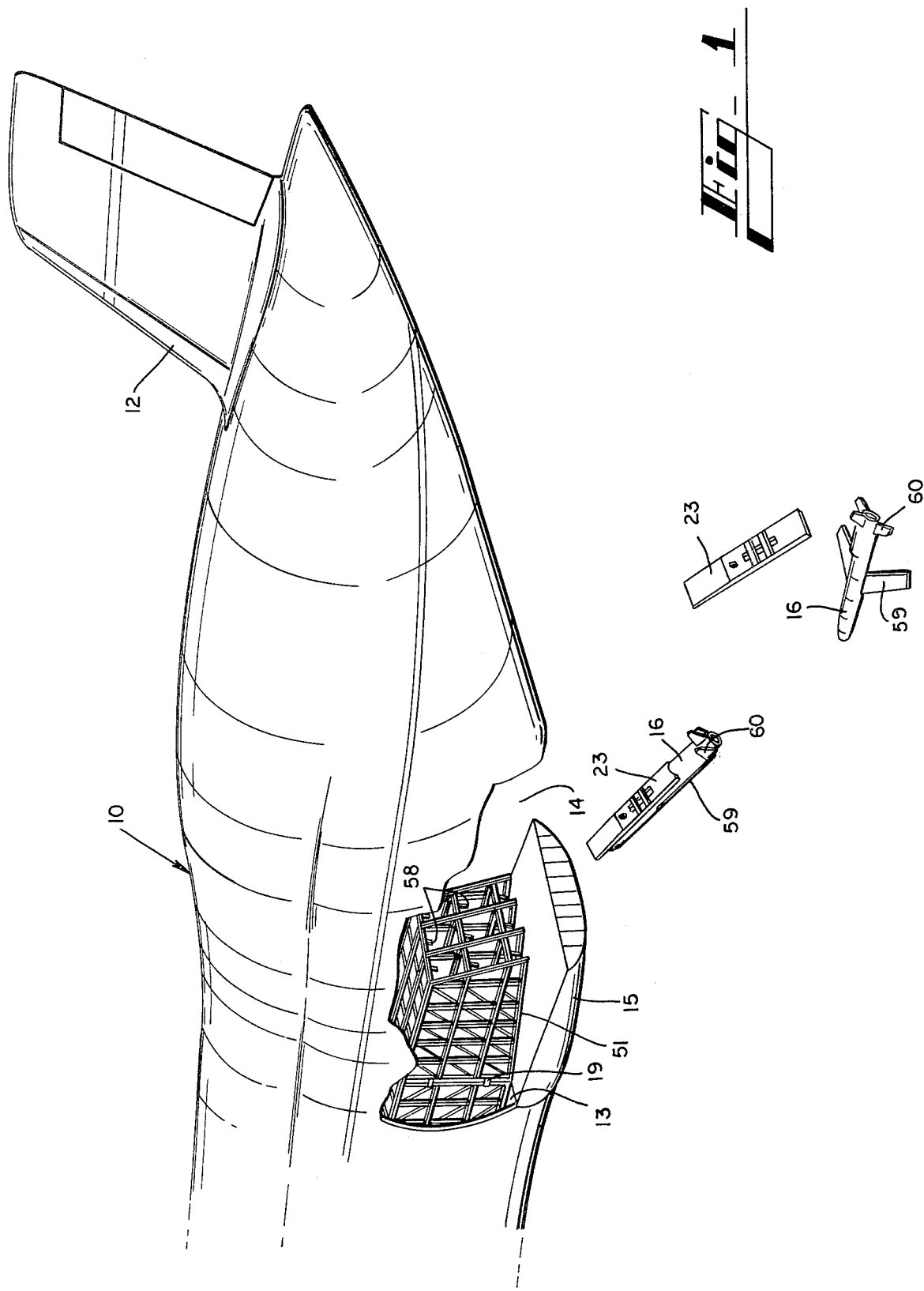

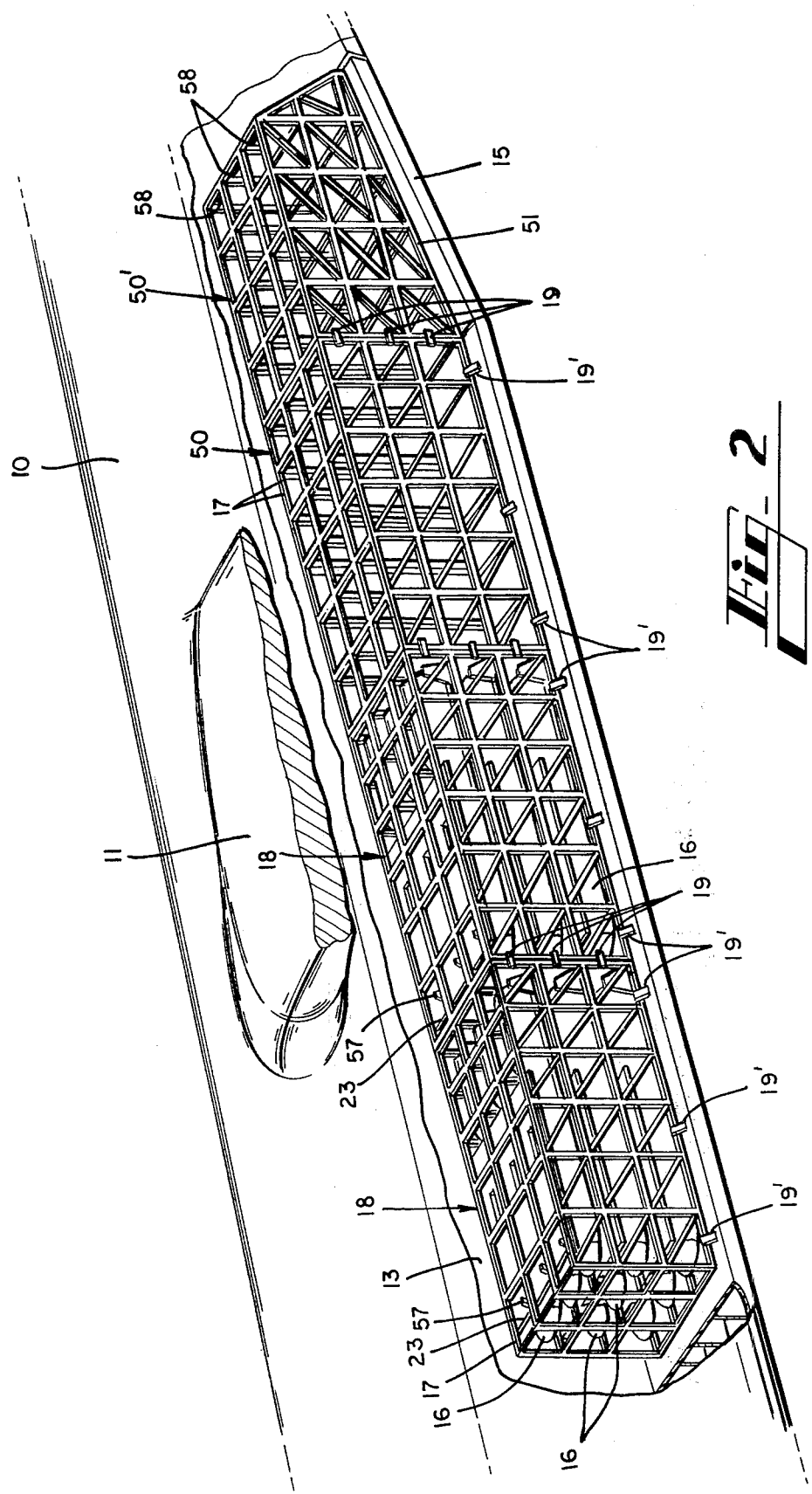

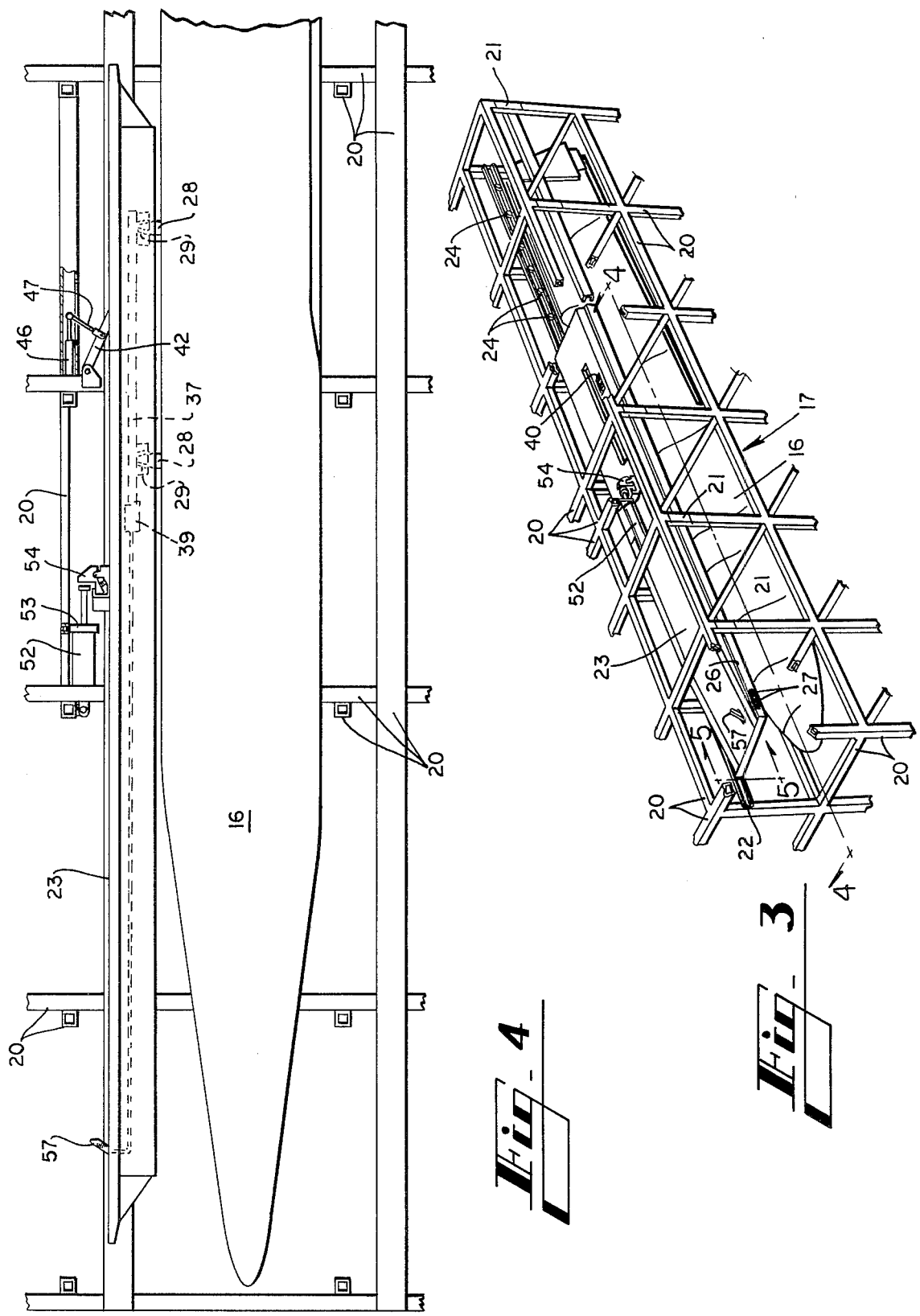

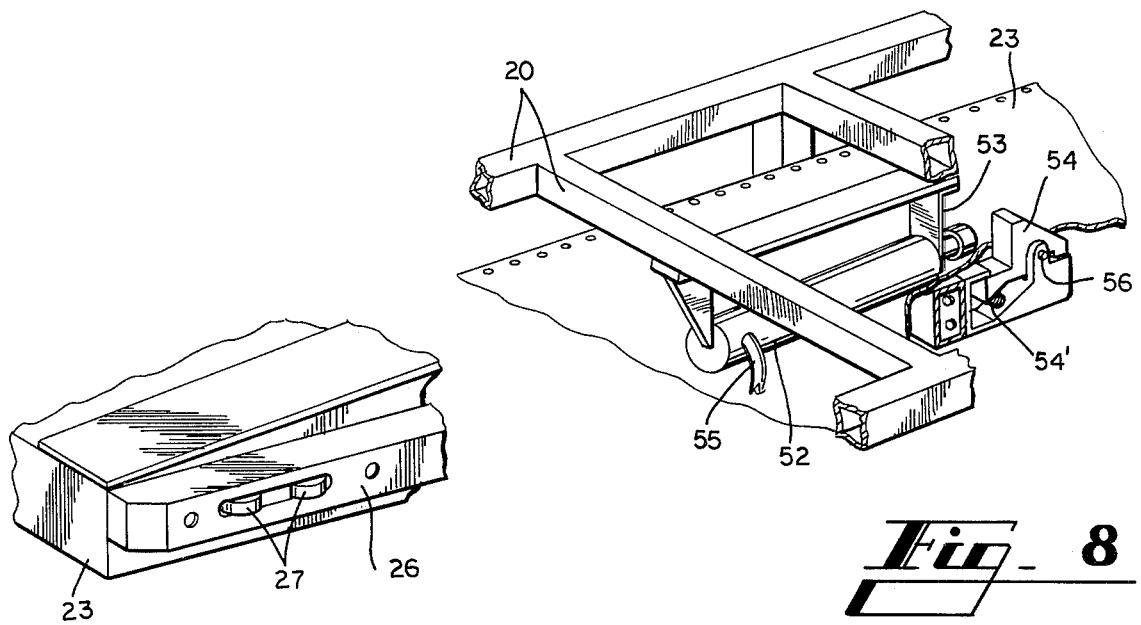
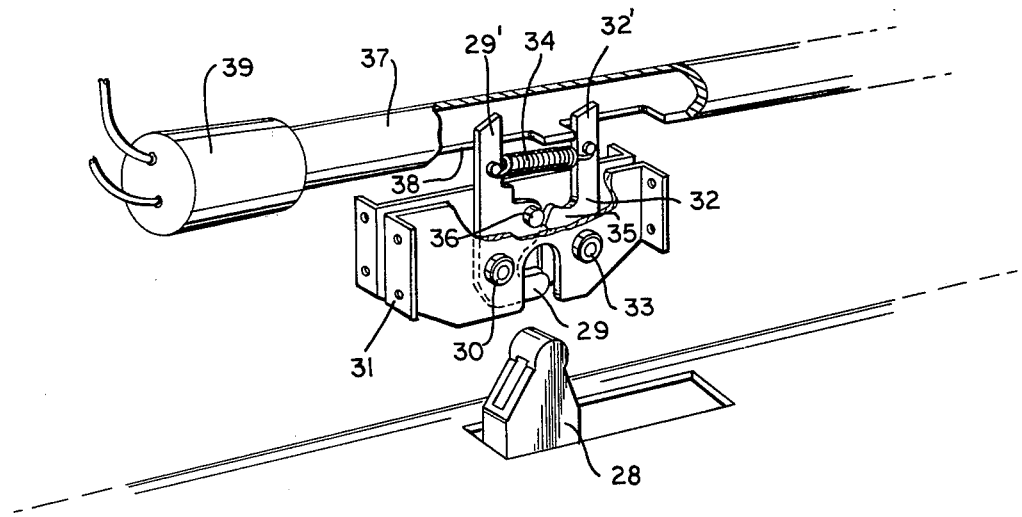

MISSILE LAUNCHER FOR AIRCRAFT

This invention relates generally to deployment systems for onboard cargo from aircraft during flight and more particularly to such a system especially designed and adapted for efficiently, reliably and safely airdropping or launching missiles, such as for example the AGM-109 or AGM-86B Cruise Missile.

A primary concern in launching cruise missiles from aircraft is the possiblility of malfunction or breakdown in the launching mechanism which would result in an inability to deploy or jettison the missile. Existing launchers and those heretofore proposed include interface racks and carriages which are undesirably complex and prone to fail, jam or otherwise malfunction. This is true of both those launchers which are mounted externally and those mounted internally of the aircraft and extended prior to their release and firing.

The present invention proposes to simplify cruise missile launching from aircraft to a bare minimum of complexity while providing a completely efficient and reliable system. To this end it is recognized that with the larger cargo type aircraft of today a sufficient load of cruise missiles on the order of 3,000 pounds each and up can be carried internally of the aircraft. To take full advantage of this, however, deployment of the missiles cannot include the usual extension mechanisms to dispose the missiles externally for ejection and firing. Also end openings in the fuselage through which the missiles are ejected directly from their storage position in the hold of the fuselage become highly desirable.

To facilitate storing, moving and loading of the missiles onto the aircraft the instant invention envisions the prepackaging of a selected number of missile each in its own individual position in a multiple cell module. Thus, multiple missile-carrying modules of uniform design, size and shape are adapted for interconnection one with another into a train of aligned end-to-end and side-by-side, stacked missiles when installed in the airplane cargo storage compartment or hold.

The foregoing multiple cell module structure and arrangement is similar to that found in a previously filed application for patent, Ser. No. 881,175, now U.S. Pat. No. 4,161,301 entitled "Deployment Apparatus For Stores From Vehicles" in the name of Richard G. Beardsley and Norman S. Currey and assigned to Lockheed Corporation, assignee of the present application. The earlier application discloses a minelaying apparatus which consists essentially of a plurality of cradles each adapted to underlie and support a mine in the airplane hold. Each cradle is specifically contoured to receive and contain its store which is strapped down to ensure against relative movement until released. A drive mechanism is employed between the several cradles and the pallets on which the cradles are mounted to facilitate the movement of the cradles relative to the pallets and the aircraft during deployment. When deployed the straps are released and the cradles are separated from the mine.

In contrast to the above prior art disclosure the launcher contemplated herein requires no specific contouring for different missiles or stores, providing a universal handling, ejection and launching mechanism compatible with and complemental to existing, state-of-the-art missiles. Also, there is no requirement for modification or strengthening of the store to interface, and releasably interconnect, with mounting and carrying structures. At the same time the present launcher minimizes the loose parts upon ejection of the missile.

More specifically, as envisioned by the instant invention each missile-carrying module cell includes longitudinal tracks designed and adapted to receive rollers or equivalent antifriction devices carried by an overhead carriage to which the associated missile is secured. The several aligned cells thereby serve as continuous slides for all of the missiles in each line. In this manner the missiles are moved lingitudinally of the cargo hold when released by restraints which secure them to their respective cells during flight of the aircraft.

Movement of the missiles upon release by their individual restraints is effected by gravity alone although such movement may be, and preferably is, initiated by a shove or kick from a single action power unit. The length of slide or roll of the missile along the cell tracks is such as to produce the required acceleration of the missile for ejection from the cargo hold and separation from the airflow field in the wake of the airplane.

Once separated from the airplane a mechanism activates the stabilizers of the missile to the fully deployed position and effects separation of each missile from its carriage. Thereafter, ignition or firing of the missile occurs to complete the launch operation and send the missile toward its target. Thus, the entire missile load can be launched with virtually no limitation on the rapidity thereof.

With the above and other objects in view, as will be apparent this invention consists in the construction, combination and arrangement of parts all as hereinafter more fully described, claimed and illustrated in the accompanying drawings, wherein:

FIG. 1 is a perspective view of the aft end portion of an airplane in flight with its aft end door open for airdrop of missiles from the interior thereof and with portions of the fuselage broken away to reveal parts of the cellular modules and showing two stages of a released missile, i.e., before separation from its carriage and after separation from its carriage with its wings and fins deployed;

FIG. 2 is a perspective view of the hold area of the same airplane with parts broken away to show primarily the side-by-side, stacked missile-carrying cells and the aligned position of each row and tier as well as the connectors by which the cellular modules are securd one to the next and to the airplane;

FIG. 3 is a perspective view of a single missile in its carrying cell with parts broken away to reveal the missile carriage and the coacting elements between the cell and the carriage;

FIG. 4 is a section taken along the line 4—4 of FIG. 3 to show generally the interconnection and disconnection devices associated with each missile and its carriage and the carriage with its cell;

FIG. 7 is a perspective view of a fragment of a missile carriage at the front end thereof to show a side rail and rollers mounted thereon which coact with tracks carried by each cell within a module;

Figure 5:
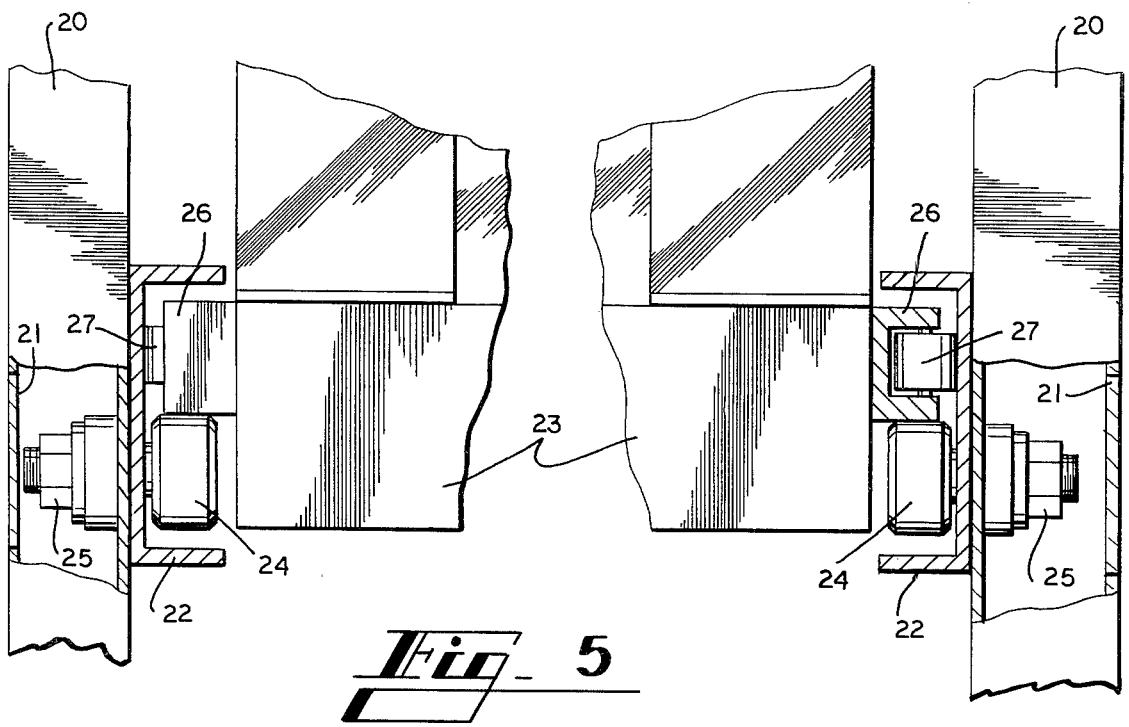
FIG. 5 is a section taken along the line 5—5 of FIG. 3 to show the track and rollers arrangement operative between the sides of each missile carriage and its cell, only fragments of the adjacent carriage and cell being shown.
Figure 6:
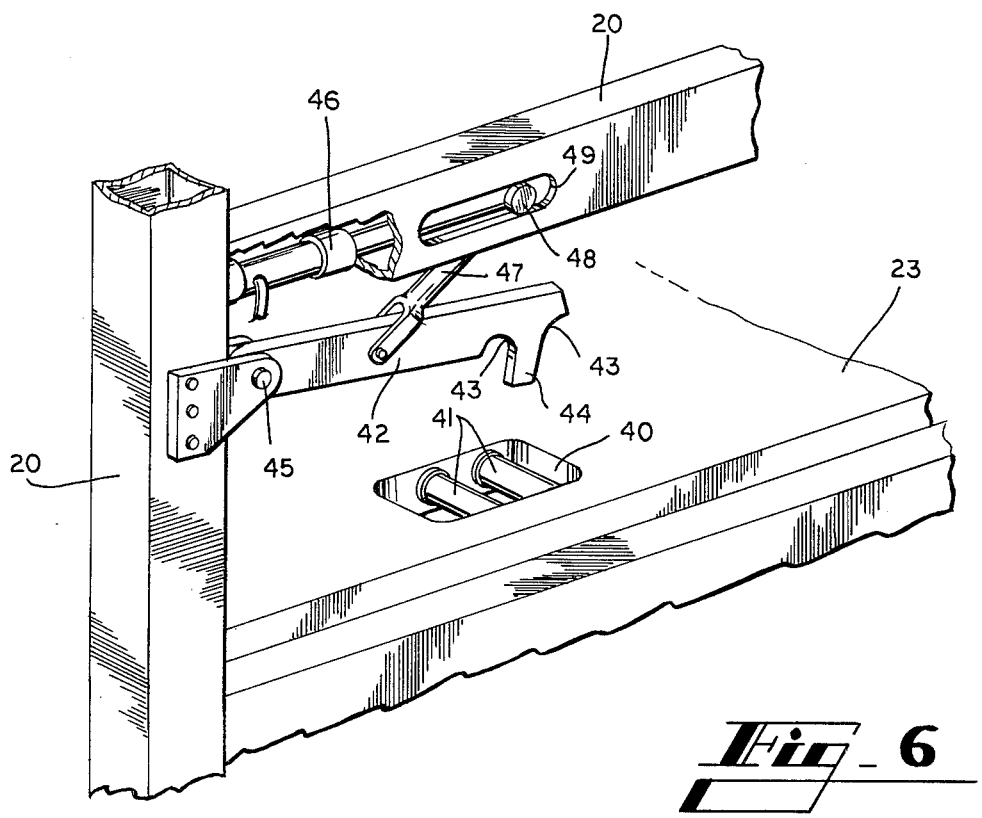
FIG. 6 is a perspective view of a fragment of one of the module cells and a missile carriage to show the releasable restraint or connector therebetween and its actuating mecahnism, the connector being disposed in the carriage-releasing position.

FIG. 8 is a perspective view of a fragment of one of the missile-carrying cells and missile carriage to show the power unit carried thereby and the thrust plate projecting from the carriage and against which the power unit acts; and FIG. 9 is a perspective view of a fragment of one of the missiles and an associated latch or releasable connector between such missile and its carriage to show the actuating mechanism therefor, said mechanism disposed with the connector in its closed position. Referring more particularly to the drawings, 10 designates the fuselage of a typical cargo type airplane having a fixed wing 11 extending from each side thereof and terminating at its aft end in a tail section 12. Internally of the fuselage 10 is a cargo storage compartment or hold 13. An access opening 14 is provided in the fuselage 10 adjacent the aft end thereof for on and off loading and air-dropping of cargo with a closure or door 15 adapted to overlie and enclose such opening 14 during normal flight of the airplane. When opened by any appropriate state-of-the-art means, the inner surface of the door 15 serves to extend the floor of the hold 13 to act as a ramp for on and off cargo loading or a platform for air-dropping cargo as will become more apparent. When closed, the external surface of the door 15 forms a smooth and uninterrupted continuation of the fuselage skin in keeping with good aerodynamic practice.

As envisioned herein a multiplicity of missiles 16 are carried within the airplane hold 13, each individually secured in its own cell 17. The several cells 17 are interconnected in side-by-side, parallel rows and stacked in tiers to form transport module 18. Preferably, each transport module 18 thus formed is a single, integral structure as illustrated comprised of, for example, nine missile-containing cells 17. Multiple modules 18 ae placed within the hold 13 in end-to-end alignment and interconnected as at 19 to one another and to the adjacent airplane structure as at 19' so as to be relatively unmovable.

Each cell 17 is preferably formed by an open framework of tubular beams 20 disposed at various angles to each other to provide sufficient structural integrity. Slots 21 are provided in localized areas of the beams 20 to provide access to the interior thereof as required for parts and mountings to be described. Within each cell 17 adjacent the top thereof and coextensive in length therewith is a pair of aligned channels 22 which open toward each other and constitute tracks for coaction with antifriction means carried on opposite sides of a carriage member 23 individual to each missile 16.

More particularly, each channel or track 22 contains a number of freely rotatable rollers 24 secured thereto as at 25 at spaced intervals along the length thereof. A shoulder or rail 26 coextensive in length with, and extending from each side of, the carriage 23 is adapted to rest on the several track rollers 24 whereby the carriage 23 is supported in a position at the top of its cell 17. Freely rotatable rollers 27 mounted in the end face of each rail 26 so as to extend therefrom contact the adjacent surface of the associated track 22. The position of the carriage 23 within its cell 17 is thereby restricted against relative lateral movement while completely free to move longitudinally.

Each missile 16 is in turn connected to, so as to be carried by, its carriage 23 through a pair of spaced, interconnected latches which operate in unison. This makes for a connection which is compatible with and complemental to standard bomb shackle mechanisms which have been used in proven fashion over the years.

More specifically each such latch consists of an upright clevis 28 extending from the missile 16 and engaged by a depending hook 29 carried by the carriage 23. The hooks 29 are each pivotally mounted as at 30 on a bracket 31 secured to the carriage 23 and normally retained in the locked or clevis engaging position by a lever 32 pivotally mounted as at 33 on the bracket 31 in opposition to the hook 29. The opposite corresponding ends of the hooks 29 and levers 32 terminate in spaced arms 29' and 32' respectively which are interconnected by a tension spring 34 whereby a projection 35 on the associated lever 32 and a stud 36 on the adjacent hook 29 medially of their respective lengths are normally held in abutment and the hooks 29 and clevises 28 engaged.

A reciprocable tube 37 appropriately mounted within the carriage 23 in any conventional manner is disposed adjacent the hooks 29 and clevises 28 just described. The wall of this tube 37 is slotted as at 38 to accommodate the extending ends of the arms 29' and 32'. Upon reciprocation of the tube 37 by suitable power means such as, for example, a pneumatic actuator 39 one edge of each of the adjacent slots 38 is forced against each arm 32' pulling each associated arm 29' with it. This causes a rotation of the hooks 29 in unison out of their respective clevises 28 releasing the missile 16.

Normally, each carriage 23 with its missile 16 attached as above described is retained against relative longitudinal movement in its cell 17. To this end the upper surface of each carriage 23 is notched as at 40 to accommodate a pair of spaced, transverse pins 41 secured in fixed position by any suitable means. The outer end of a retention hook 42 is formed or otherwise provided wih edge surfaces 43 complemental to the surfaces of the pins 41 and a projection 44 designed to fit between the pins 41 when such complemental surfaces abut.

At its other end each retention hook 42 is pivotally secured as at 45 to an adjacent cell beam 20 whereby it is rotatable out of its normal carriage engaging position. For this purpose a power actuator such as a pneumatic cylinder 46 is provided with a pivot arm 47 connecting the movable, outer end of the cylinder 46 to the hook 42 medially of its length. The cylinder 46 is preferably mounted internally of an adjacent cell beam 20 with a stud 48 projecting from its movable outer end slidable in a slot 49 provided therefor in the beam 20 to control its linear movement.

In view of the foregoing construction and arrangement, it should now be apparent that with the several missile-carrying modules 18 secured one to another and to the airplane 10 the missiles 16 and their carriages 23 starting with the aftmost may be released for ejection from the airplane 10. To facilitate this, an acceleration module 50 is employed at the aft end of the aftmost module 18. For all intents and purposes the forward portion of this acceleration module 50 is identical to the modules 18 including tracks and rollers equivalent to the tracks 22 and rollers 24 with which they align and of which they form continuations.

The module 50 differs from the modules 18 in that it includes an aft portion 50' secured to it through connectors 19 and the lower or bottom side 51 of this aft portion 50' is angled or sloped to correspond to the inner surface of the door 15 when closed. Also, the aft portion 50' includes no transverse beams 20 on its bottom side, nor connector elements like the connectors 19' between it and the airplance structure. The module 50 is nevertheless connected to the other modules 18 and through these modules 18 to the airplane 10 through connectors 19 between it and the adjacent module 18. The acceleration module 50 serves to give each missile 16 and carriage 23 an additional running distance to insure its exit speed from the airplane 10.

In addition, initial movement of each missile 16 and carriage 23 when free to do so upon release of the hook 42 by operation of the cylinder 46 as described is assured by a thrust device or kicker associated with each cell 17. Each such kicker is formed by a power cylinder 52, preferably pneumatic, mounted on a bracket 53 secured in an appropriate manner to beams 20 so as to be disposed above the carriage 23 of each missile 16. The movable outer end of the cylinder 52 is adjacent a thrust plate 54 which extends from the associated carriage 23 and when actuated or fired by the release of pressurized fluid from an on board source (not shown) through an inlet line 55 strikes the plate 54. The carriage 23 with missile attached is thereby forced in an aft direction supplementing gravity drop due to a nose up attitude of the airplane 10.

Each thrust plate 54 is pivotally mounted as at 56 to the carriage 23 and normally held in an upright position by a compression spring 54' operative between the plate 54 and carriage structure. This permits the depression of the plate 54 of each upstream carriage 23 as it moves downstream during the ejection operation and strikes obstructions, such as cylinders 52 on the aft cells 17.

As each carriage 23 and its attached missile 16 is thus ejected from the airplane 10, the retention hooks 29 are actuated to release their respective clevises 29 for separation of the missile 16 from the carriage 23. To this end a trigger 57 is provided at the forward end of each carriage 23 which is adapted to strike a tripper 58 secured to the aft end of each cell of the acceleration module 50. Through conventional connections the trigger 57 is operatively linked to the ignition system of the missile 16 which is thereby fired at a predetermined time allowing for safe clearance of the airplane 10. Similarly the wings 59 and fins 60 of the missile 16 are deployed to their flight position.

While the invention has been hereinabove illustrated and described in what is believed to be its best and most practical form under present-day condition, it is recognized that under other conditions this form would be modified. No attempt has been made to specifically incorporate any of such other forms in this disclosure in the interest of clarity of the total inventive concept. The claims are relied upon to cover these other forms generally.

What is claimed is:

1. The combination with an aircraft having an internal storage compartment, an access opening in said aircraft to said compartment, and a removable and replaceable closure for said opening, of a missile launcher adapted for installation in said compartment comprising:

at least one transport module formed by at least one missile-carrying cell releasably secured in a fixed position in said compartment, each said transport module being disposed with its missile in end-to-end alignment with the missile of the next adjacent transport module and with said access opening;

an acceleration module formed by a corresponding number of empty cells similar to said transport module cells secured to the end of the last of said transport modules and disposed adjacent said access opening with each of its cells in alignment with one of said transport module cells and said opening;

a carriage superimposed above each missile;

a slidable engagement between each said carriage and each said aligned transport module and acceleration module cell;

a first connector between each transport module cell and the associated carriage to secure them against relative movement;

a second connector between each carriage and its associated missile to secure them against relative movement; and a release operable between each said first and second connectors respectively to disconnect each said carriage from its cell and each said missile from its carriage.

2. The combination of claim 1 wherein said slidable engagement includes aligned tracks and rollers carried by each cell and aligned rails and rollers carried by each carriage, said track rollers and said rail rollers being disposed at relative right angles.

3. The combination of claim 1 wherein said first and second connector releases each include a pneumatic cylinder.

4. The combination of claim 1 wherein said missile launcher includes a power actuator operative between each said module cell and the associated carriage for the relative movement thereof upon release of said second connector.

5. The combination of claim 4 wherein each said power actuator is carried by each module cell and operative against a thrust plate carried by the associated carriage, each said thrust plate being restricted against movement in the direction toward said actuator and free to move in the opposite direction.

6. The combination of claim 1 wherein said second connector includes a pair of spaced, interconnected latches and a power actuator for the operation thereof in unison.

7. The combination of claim 6 including a trigger carried by each carriage for operation of its associated actuator and a tripper carried by each acceleration module cell at the aft end thereof and disposed in the path of movement of each trigger of each aligned carriage.

* * * * *